US010233915B2

(12) United States Patent
Yamazaki

(10) Patent No.: US 10,233,915 B2
(45) Date of Patent: Mar. 19, 2019

(54) NEGATIVE PRESSURE PUMP AND CYLINDER HEAD COVER

(71) Applicant: SANOH INDUSTRIAL CO., LTD., Tokyo (JP)

(72) Inventor: Nobushi Yamazaki, Ibaraki (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 318 days.

(21) Appl. No.: 14/888,991

(22) PCT Filed: May 19, 2014

(86) PCT No.: PCT/JP2014/063254
§ 371 (c)(1),
(2) Date: Nov. 4, 2015

(87) PCT Pub. No.: WO2015/015868
PCT Pub. Date: Feb. 5, 2015

(65) Prior Publication Data
US 2016/0084244 A1 Mar. 24, 2016

(30) Foreign Application Priority Data

Jul. 30, 2013 (JP) ................................ 2013-157712

(51) Int. Cl.
F04C 29/00 (2006.01)
F04B 37/14 (2006.01)
(Continued)

(52) U.S. Cl.
CPC .............. *F04B 37/14* (2013.01); *F04B 35/00* (2013.01); *F04B 35/002* (2013.01);
(Continued)

(58) Field of Classification Search
CPC .... F04C 29/005; F04C 29/0071; F04C 25/02; F16D 27/112; F16D 27/10; F16D 27/108;
(Continued)

(56) References Cited

U.S. PATENT DOCUMENTS 2,230,717 A * 2/1941 De Lancey ............. F23K 5/145
290/50
4,009,971 A * 3/1977 Krohn ....................... F04B 9/02
417/223

(Continued)

FOREIGN PATENT DOCUMENTS

JP 08-072700 3/1996
JP 2010-112337 A 5/2010
(Continued)

OTHER PUBLICATIONS

Machine Translation of JP-08072700.*
(Continued)

*Primary Examiner* — Christopher S Bobish
(74) *Attorney, Agent, or Firm* — Marshall, Gerstein & Borun LLP

(57) ABSTRACT

A negative pressure pump has: a casing; a pump portion; a drive-side clutch plate that rotates integrally with a drive shaft, is movable in an axial direction of the drive shaft, and is magnetic; a driven-side clutch plate that rotates integrally with a driven shaft and transmits the rotation of the drive shaft to the driven shaft as a result of the drive-side clutch plate becoming engaged with it; a coil spring that presses the drive-side clutch plate against the driven-side clutch plate; an electromagnet that produces a magnetic force counter to a pressing force and pulls the drive-side clutch plate away from the driven-side clutch plate; and a jutting wall portion that is disposed in the casing and receives the driven-side (Continued)

clutch plate on which the pressing force acts and a jutting wall portion that supports one end portion of the coil spring.

5 Claims, 8 Drawing Sheets

(51) Int. Cl.
*F16D 27/112* (2006.01)
*F16D 27/108* (2006.01)
*F16D 27/14* (2006.01)
*F04B 35/04* (2006.01)
*F04B 35/00* (2006.01)
*F04C 25/02* (2006.01)
*F04B 37/16* (2006.01)
*F16D 27/11* (2006.01)

(52) U.S. Cl.
CPC ............ *F04B 35/045* (2013.01); *F04C 25/02* (2013.01); *F04C 29/005* (2013.01); *F16D 27/108* (2013.01); *F16D 27/112* (2013.01); *F16D 27/14* (2013.01); *F04B 37/16* (2013.01); *F16D 27/11* (2013.01)

(58) Field of Classification Search
CPC .......... F16D 27/11; F16D 27/14; F04B 37/14; F04B 35/045; F04B 35/002; F04B 35/00
USPC .............................. 417/223; 123/41.47, 198 C
See application file for complete search history.

(56) References Cited

U.S. PATENT DOCUMENTS

| | | | | |
|---|---|---|---|---|
| 4,056,178 A * | 11/1977 | Detty | ................... | F16D 35/024 192/58.61 |
| 4,494,917 A * | 1/1985 | Komori | ................. | F04C 29/005 418/270 |
| 4,516,918 A * | 5/1985 | Drutchas | ................. | F04C 14/16 418/102 |
| 4,632,639 A * | 12/1986 | Beaumont | ............... | F04B 49/18 192/85.37 |
| 4,840,543 A * | 6/1989 | Geberth, Jr. | .......... | F16D 27/112 192/107 R |
| 4,901,837 A * | 2/1990 | Wheeler | ................. | F04B 49/02 192/85.53 |
| 4,993,532 A * | 2/1991 | Weiss | ...................... | F16D 13/75 188/196 P |
| 5,989,151 A * | 11/1999 | Kershaw | ................. | F01P 7/048 123/41.12 |
| 6,209,700 B1 * | 4/2001 | Wogaman | ............... | F16D 27/06 192/84.94 |
| 7,051,690 B2 * | 5/2006 | Dietz | ...................... | B60T 17/02 123/90.15 |
| RE42,817 E * | 10/2011 | Dietz | ...................... | B60T 17/02 123/90.15 |
| 8,449,277 B2 * | 5/2013 | Sakakibara | .......... | F04C 18/3441 418/188 |
| 8,545,191 B2 * | 10/2013 | Ikegawa | ............... | F16D 27/105 192/40 |
| 8,763,734 B2 * | 7/2014 | Fetter | ...................... | B60T 17/02 180/53.1 |
| 9,038,799 B2 * | 5/2015 | Mevissen | ............... | B60K 25/00 192/90 |
| 2007/0270264 A1 * | 11/2007 | Grunwald | ............... | F16D 31/04 475/91 |
| 2012/0251347 A1 * | 10/2012 | Kimoto | ................... | F04C 23/02 417/319 |

FOREIGN PATENT DOCUMENTS

| | | | | |
|---|---|---|---|---|
| JP | 2012-122428 A | 6/2012 | | |
| JP | 2013-057293 A | 3/2013 | | |
| JP | 2013-157712 A | 8/2013 | | |
| WO | WO 2013089820 A2 * | 6/2013 | ............. | F16D 27/11 |

OTHER PUBLICATIONS

Machine Translation of JP-2013057293.*
International Search Report and Written Opinion for Application No. PCT/JP2014/063254, dated Aug. 5, 2014.
Notice of Reasons for Rejection for Japanese Application No. 2013-157712, dated May 29, 2015.

* cited by examiner

NEGATIVE PRESSURE PUMP AND CYLINDER HEAD COVER

TECHNICAL FIELD

The present invention relates to a negative pressure pump and a cylinder head cover.

BACKGROUND ART

In JP-A No. 2010-112337, there is disclosed a vacuum (negative pressure pump) having a pump portion that produces negative pressure as a result of a rotational force being transmitted to it from a shaft coupled to a motive power source. This vacuum pump transmits the rotational force of the shaft to the pump portion by using a spring force to press a clutch plate attached to the distal end of a rotating shaft of the pump portion against a clutch plate attached to the distal end of the shaft.

Furthermore, in this vacuum pump, when the inside of the pump portion reaches a prescribed negative pressure, the clutch plate of the pump portion is separated from the clutch plate of the shaft by a force produced by a diaphragm, and thus energy loss caused by driving the pump portion is reduced.

SUMMARY OF INVENTION

Technical Problem

In the vacuum pump of JP-A No. 2010-112337, because the clutch plate of the pump portion is pressed against the clutch plate of the shaft, a thrust force (a force in the axial direction of the shaft) acts on the shaft. Although there is also a method wherein a bush or the like is disposed to control the action of the thrust force on the shaft, there arises the problem that costs increase.

It is a problem of the present invention to provide a negative pressure pump and a cylinder head cover that control the action of a thrust force on a drive shaft driven to rotate by a motive power source and reduce energy loss of the motive power source by intermittently transmitting the rotation from the drive shaft.

Solution to Problem

A negative pressure pump of a first aspect of the present invention comprises: a casing inside of which a drive shaft driven to rotate by a motive power source is inserted and disposed; a pump portion that is formed in the casing, is equipped with a driven shaft, and produces negative pressure as a result of the rotation of the drive shaft being transmitted to the driven shaft; a drive-side clutch plate that is attached to the drive shaft, is movable in an axial direction of the drive shaft, rotates integrally with the drive shaft, and is magnetic; a driven-side clutch plate that is attached to the driven shaft, rotates integrally with the driven shaft, and transmits the rotation from the drive shaft to the driven shaft as a result of the drive-side clutch plate becoming engaged with the driven-side clutch plate; an elastic body which, by means of its elastic force, presses the drive-side clutch plate against the driven-side clutch plate to cause the drive-side clutch plate to engage with the driven-side clutch plate; an electromagnet that is fixed to the casing, produces a magnetic force counter to the pressing force of the elastic body, and pulls the drive-side clutch plate away from the driven-side clutch plate to cancel a state of engagement therebetween; a first wall portion that is disposed on a pump portion side of the casing and receives the driven-side clutch plate on which the pressing force of the elastic body acts; and a second wall portion that is disposed on an opposite side from the pump portion side of the casing and supports an end portion, on the opposite side, of the elastic body.

In the negative pressure pump of the first aspect, the drive-side clutch plate is pressed against, and engages with, the driven-side clutch plate by the pressing force (elastic force) of the elastic body, and thus the rotation of the drive shaft is transmitted to the driven shaft and the pump portion produces negative pressure.

When the electromagnet produces the magnetic force counter to the pressing force of the elastic body, the electromagnet attracts the drive-side clutch plate that is magnetic, so the drive-side clutch plate is pulled away from the driven-side clutch plate and the state of engagement between the drive-side clutch plate and the driven-side clutch plate is canceled. Because of this, the pump portion stops producing negative pressure.

In this way, the negative pressure pump can intermittently transmit the rotation from the drive shaft to the pump portion, so energy loss of the motive power source can be reduced.

Furthermore, in the negative pressure pump, the driven-side clutch plate on which the pressing force of the elastic body acts is received by the first wall portion disposed on the pump portion side of the casing. The end portion of the elastic body on the opposite side of the pump portion side is supported by the second wall portion disposed on the opposite side of the pump portion side of the casing. Additionally, because the drive-side clutch plate that receives the pressing force from the elastic body and receives the magnetic force from the electromagnet is movable in the axial direction of the drive shaft, the action of the thrust force, caused by the pressing force of the elastic body and the magnetic force of the electromagnet, on the drive shaft is controlled.

A negative pressure pump of a second aspect of the present invention is the negative pressure pump of the first aspect in which, all or part of the casing is a nonmagnetic body.

In the negative pressure pump of the second aspect, because the casing is a nonmagnetic body, the magnetic force produced from the electromagnet is not transmitted to the casing (in other words, the magnetic force is not dispersed), so power consumption can be controlled and the drive-side clutch plate can be pulled away from the driven-side clutch plate.

A negative pressure pump of a third aspect of the present invention is the negative pressure pump of the first aspect in which, a flow path that guides a lubricant supplied into the pump portion from the pump portion to contact surfaces of the drive-side clutch plate and the driven-side clutch plate is formed in the casing.

In the negative pressure pump of the third aspect, the lubricant is guided, through the flow path, from the pump portion to the contact surfaces of the drive-side clutch plate and the driven-side clutch plate, so wear on the contact surfaces of the drive-side clutch plate and the driven-side clutch plate is controlled. Furthermore, heat produced by friction between the drive-side clutch plate and the driven-side clutch plate is also controlled.

A negative pressure pump of a fourth aspect of the present invention is the negative pressure pump of the first aspect in which, the negative pressure pump changes a current applied to the electromagnet in accordance with a distance between contact surfaces of the drive-side clutch plate and the driven-side clutch plate.

In the negative pressure pump of the fourth aspect, the intensity of the attractive force (force of attraction) resulting from the magnetic force of the electromagnet changes in accordance with the distance (hereinafter appropriately called a "clutch gap") between the contact surfaces of the drive-side clutch plate and the driven-side clutch plate. Here, by changing the current applied to the electromagnet in accordance with the clutch gap, the force of attraction acting on the drive-side clutch plate can be maintained at a constant value (a force of attraction sufficient to pull the drive-side clutch plate away from the driven-side clutch plate), so power consumption can be improved.

A cylinder head cover of a fifth aspect of the present invention is equipped with the negative pressure pump of the first aspect, forms part of the casing, and covers a cylinder head of an engine serving as a motive power source.

Because the cylinder head cover of the fifth aspect is equipped with the negative pressure pump of the first aspect, the action of the thrust force on the drive shaft driven to rotate by the engine serving as the motive power source can be controlled, and energy loss of the engine can be reduced by intermittently transmitting the rotation from the drive shaft. Because of this, the fuel economy of the engine (vehicle) can be improved.

Furthermore, because the cylinder head cover forms part of the casing, manufacturing costs can be reduced compared, for example, to a configuration where the cylinder head cover and the negative pressure pump are separate bodies.

Advantageous Effects of Invention

According to the negative pressure pump and the cylinder head cover of the present invention, the negative pressure pump and the cylinder head cover can control the action of the thrust force on the drive shaft driven to rotate by the motive power source and reduce energy loss of the motive power source by intermittently transmitting the rotation from the drive shaft.

DESCRIPTION OF EMBODIMENTS

First Embodiment

Figure 2:
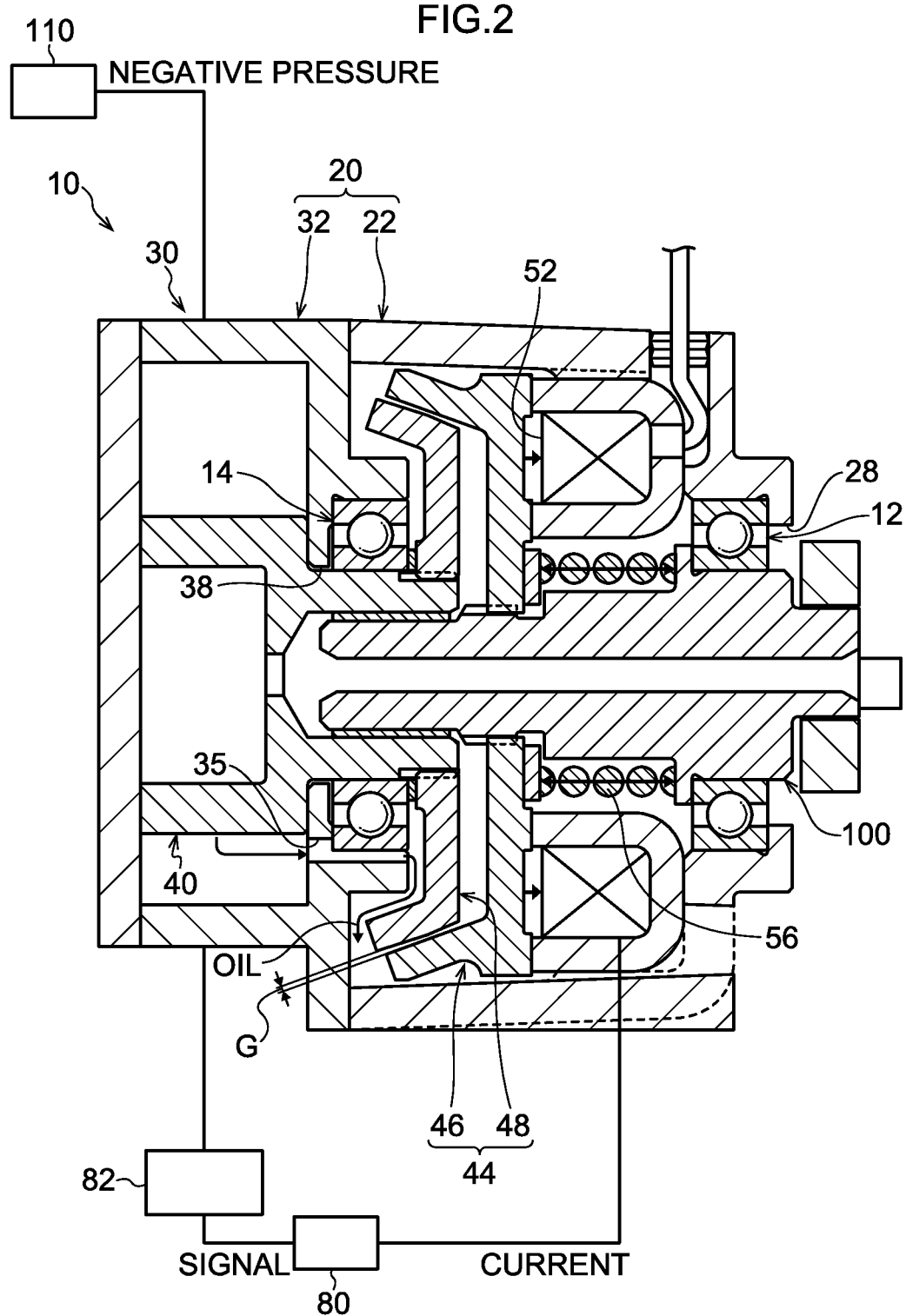
FIG. 2 is a sectional view, along the axial direction of the negative pressure pump, showing a state in which a drive-side clutch plate has been pulled away from a driven-side clutch plate in the negative pressure pump of FIG. 1.
Figure 3:
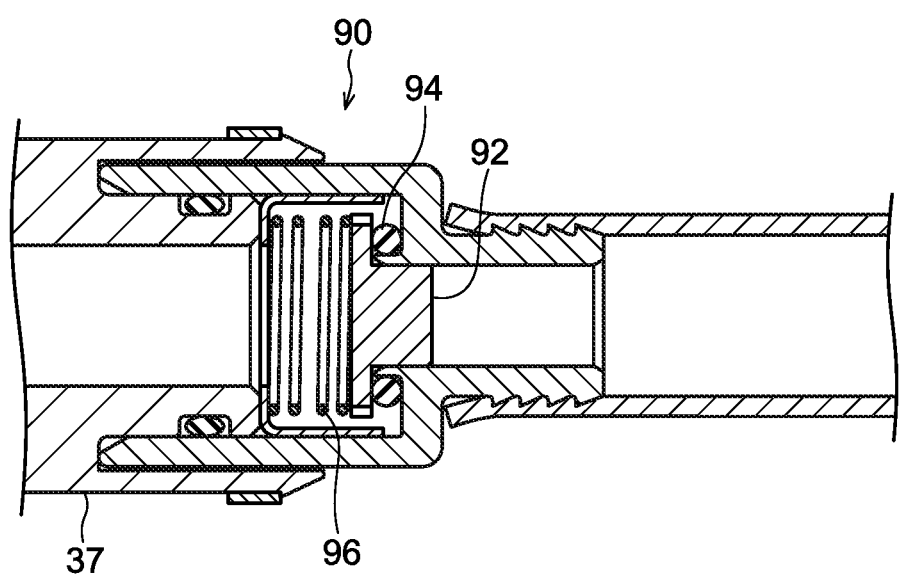
FIG. 3 is a sectional view, along a flow path direction, of a check valve with which the negative pressure pump of FIG. 1 is equipped.

A negative pressure pump of a first embodiment of the present invention will be described in accordance with FIG. 1 to FIG. 3.

A negative pressure pump 10 of the present embodiment is a device that produces negative pressure by the rotation of a drive shaft 100 driven to rotate synchronously with a crankshaft of an engine (not illustrated in the drawings) serving as a motive power source, and is used in a negative pressure brake booster 110 of a vehicle. It should be noted that the present invention is not limited to this configuration, and a motor or the like may also be used as the motive power source of the negative pressure pump.

Figure 1:
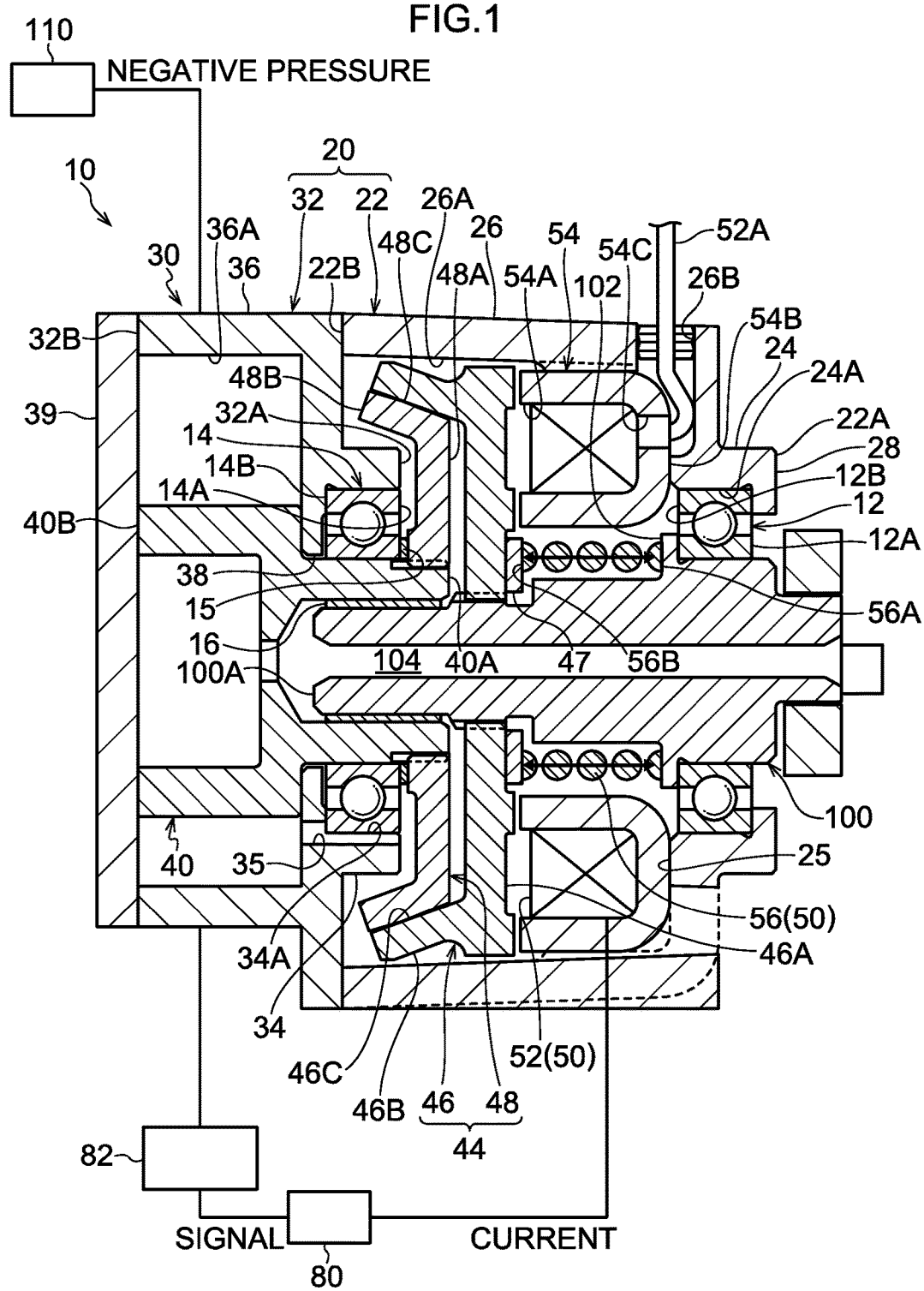
FIG. 1 is a sectional view, along an axial direction, of a negative pressure pump of a first embodiment of the present invention.

As shown in FIG. 1, the negative pressure pump 10 has a casing 20, a pump portion 30 that is formed in the casing 20, and a clutch 44 and a clutch intermittent mechanism 50 that are housed in the casing 20.

The casing 20 is configured by a first casing 22, inside of which the drive shaft 100, the clutch 44, and the clutch intermittent mechanism 50 are housed, and a second casing 32, which configures the pump portion 30.

The first casing 22 is formed in a substantially cylindrical shape and is configured by a cylinder portion 24, which includes one axial direction end portion 22A (the end portion on the right side in FIG. 1) of the first casing 22, and a cylinder portion 26, which forms the other section of the first casing 22, includes the other axial direction end portion 22B of the first casing 22, and is larger in diameter than the cylinder portion 24. The drive shaft 100 is inserted through the cylinder portion 24 and disposed inside the cylinder portion 26.

An annular bearing 12 that rotatably supports the drive shaft 100 along an inner peripheral surface 24A of the cylinder portion 24 is attached to the inner peripheral surface 24A. Furthermore, a jutting wall portion 28 that juts inward in the radial direction is disposed on the one end portion 22A of the cylinder portion 24. The jutting wall portion 28 is in contact with a side surface 12A on one axial direction side (the right side in FIG. 1) of the bearing 12. Because of this jutting wall portion 28, the movement of the bearing 12 toward the one axial direction side is limited. It should be noted that the jutting wall portion 28 supports a later-described coil spring 56 via a flange portion 102 and a bearing 12. That is, the spring force of the coil spring 56 is received by the jutting wall portion 28.

The flange portion 102, which is formed on the drive shaft 100, is in contact with a side surface 12B on the other axial direction side (the left side in FIG. 1) of the bearing 12.

An annular member 54, to which an electromagnet 52 that configures the clutch intermittent mechanism 50 is attached, is fixed along an inner peripheral surface 26A of the cylinder portion 26 to the one end portion 22A side of the cylinder portion 26. The electromagnet 52 is a solenoid coil and is housed in a recessed section of the annular member 54, which is formed in a cross-sectional U-shape. An open portion 54A of the annular member 54 faces the other end portion 22B side of the first casing 22. Furthermore, a bottom portion 54B of the annular member 54 is in contact with a step surface 25 formed by the difference in diameter between the cylinder portion 24 and the cylinder portion 26.

Moreover, a through hole 54C for passing through a cord 52A for applying a current to the electromagnet is formed in the bottom portion 54B of the annular member 54. The cord 52A passing through the through hole 54C passes through a through hole 26B formed in the cylinder portion 26 and is connected to a control unit 80. It should be noted that a waterproof member (not illustrated in the drawings) for preventing a later-described lubricant (in the present embodiment, engine oil) from leaking out from the first casing 22 is disposed in the through hole 26B.

A drive-side clutch plate 46 that configures the clutch 44 is attached to the drive shaft 100 and disposed nearer to the other end side 22B of the cylinder portion 26 than the annular member 54. It should be noted that the drive-side clutch plate 46 of the present embodiment is configured by a disc portion 46A and a tapered portion 46B that juts out in a tapered shape from the outer peripheral edge portion of the disc portion 46A. The drive-side clutch plate 46 is movable in the axial direction of the drive shaft 100 and is configured to rotate integrally with the drive shaft 100. Furthermore, the drive-side clutch plate 46 is formed by a material that is magnetic (in the present embodiment, iron).

The coil spring 56 is disposed between the annular member 54 and the drive shaft 100 in such a way as to surround the drive shaft 100. Specifically, the coil spring 56 is disposed between the flange portion 102 of the drive shaft 100 and the disc portion 46A of the drive-side clutch plate 46, has one end portion 56A (the end portion on the right side in FIG. 1) in contact with the flange portion 102, and has another end portion 56B in contact with a plate 47 attached to the disc portion 46A. Furthermore, the pressing force (spring force (elastic force)) of the coil spring 56 is set in such a way that the coil spring 56 presses the drive-side clutch plate 46 against a later-described driven-side clutch plate 48 and causes the drive-side clutch plate 46 to engage with the driven-side clutch plate 48. It should be noted that the coil spring 56 configures the clutch intermittent mechanism 50. Furthermore, the coil spring 56 of the present embodiment is an example of an elastic body of the present invention.

Furthermore, the aforementioned electromagnet 52 can produce a magnetic force of an intensity countering the pressing force of the coil spring 56 and is configured in such a way that, by attracting by means of this magnetic force the drive-side clutch plate 46, it can pull the drive-side clutch plate 46 away from the driven-side clutch plate 48 and cancel the state of engagement between them (details described later).

The second casing 32 is formed in a substantially cylindrical shape and is configured by a cylinder portion 34, which includes one axial direction end portion 32A (the end portion on the right side in FIG. 1) of the second casing 32, and a cylinder portion 36, which forms the other section of the second casing 32, includes the other axial direction end portion 32B of the second casing 32, and is larger in diameter than the cylinder portion 34. The second casing 32 is connected to the other end portion 22B of the cylinder portion 26 in a state in which the cylinder portion 34 has been inserted inside the first casing 22. A distal end portion 40A of a driven shaft 40 extends from the inside of the cylinder portion 36, through the cylinder portion 34, and into the cylinder portion 26.

An annular bearing 14 that rotatably supports the driven shaft 40 along an inner peripheral surface 34A of the cylinder portion 34 is attached to the inner peripheral surface 34A. Furthermore, a jutting wall portion 38 that juts inward in the radial direction is disposed on the other end side of the cylinder portion 34. The jutting wall portion 38 is in contact with a side surface 14B on the other axial direction side (the left side in FIG. 1) of the bearing 14. Because of this jutting wall portion 38, the movement of the bearing 14 toward the other axial direction side is limited.

A disc portion 48A of the driven-side clutch plate 48 attached to the driven shaft 40 is in contact, via a packing 15, with a side surface 14A on one axial direction side (the right side in FIG. 1) of the bearing 14. It should be noted that the packing 15 is used to prevent leakage of the engine oil.

It should be noted that the aforementioned jutting wall portion 38 receives, via the packing 15 and the bearing 14, the driven-side clutch plate 48 on which the pressing force of the coil spring 56 acts. That is, the spring force of the coil spring 56 is received by the jutting wall portion 38.

A cover 39 is attached to the other end portion 32B of the cylinder portion 36. Furthermore, a suction port 37 (see FIG. 3) and a discharge port (not illustrated in the drawings) are disposed in the cylinder portion 36. The suction port 37 is connected to the negative pressure brake booster 110 via a check valve 90 having a check function. The check valve 90 is configured by a valve element 92, a valve seat 94 with which the valve element 92 is brought into contact and from which the valve element 92 is separated, and a spring 96 for pressing the valve element 92 against the valve seat 94, so that the check valve 90 allows the flow of a fluid (here, air) from the negative pressure brake booster 110 toward the suction port 37 and stops the flow of the fluid from the suction port 37 toward the negative pressure brake booster 110.

A base end portion 40B of the driven shaft 40 formed in a cylindrical shape is disposed inside the cylinder portion 36. A groove (not illustrated in the drawings) that extends in the radial direction is formed in the base end portion 40B, and a plate-shaped vane 42 is disposed in the groove so as to be slidable in the groove extension direction. Because of this, the vane 42 receives centrifugal force because of the rotation of the driven shaft 40 and slides in the groove.

Furthermore, the cylinder portion 36 of the present embodiment is formed in an elliptical cylindrical shape, and the driven shaft 40 is formed in a perfectly circular cylindrical shape. That is, the cross-sectional shape of an inner peripheral surface 36A of the cylinder portion 36 is an ellipse, and the cross-sectional shape of the outer peripheral surface of the driven shaft 40 is a perfect circle. For this reason, a space (gap) occurs between the inner peripheral surface 36A of the cylinder portion 36 and the outer peripheral surface of the driven shaft 40. Here, when the driven shaft 40 rotates, the vane 42 receives centrifugal force, moves outward from the groove in the base end portion 40B, and moves along the inner peripheral surface 36A, so the space between the inner peripheral surface 36A and the driven shaft 40 becomes partitioned into plural spaces by the vane 42. Additionally, in the present embodiment, because the suction port 37 is disposed on the major axis of the cylinder portion 36 and the discharge port (not illustrated in the drawings) is disposed on the minor axis, the capacities of the partitioned spaces gradually become smaller from the suction side toward the discharge side in accompaniment with the rotation of the driven shaft 40, and because of that change in capacity, negative pressure is produced by the cylinder portion 36. That is, negative pressure is produced by the pump portion 30 as a result of the driven shaft 40 rotating. It should be noted that the pump portion 30 is configured by the second casing 32 (the cylinder portion 36), the suction port 37, the discharge port (not illustrated in the drawings), the cover 39, the driven shaft 40, and the vane 42.

Furthermore, a distal end portion 100A of the drive shaft 100 is inserted inside the distal end portion 40A of the driven shaft 40. Furthermore, a packing 16 is disposed between and in close contact with the driven shaft 40 and the drive shaft 100. The packing 16 is used to prevent leakage of the engine oil.

A flow path 104 for guiding the engine oil from the engine to the pump portion 30 is formed inside the drive shaft 100. The engine oil traveling through the flow path 104 travels through the inside of the driven shaft 40 and is supplied into the cylinder portion 34. Because of this, frictional resistance between the inner peripheral surface 36A of the cylinder portion 36 and the vane 42 can be reduced.

Furthermore, the driven-side clutch plate 48 that configures the clutch 44 is attached to the distal end portion 40A of the driven shaft 40. It should be noted that the driven-side clutch plate 48 of the present embodiment is configured by the disc portion 48A and a tapered portion 48B that juts out in a tapered shape from the outer peripheral edge portion of the disc portion 48A. The driven-side clutch plate 48 is movable in the axial direction of the driven shaft 40 and is configured to rotate integrally with the driven shaft 40. Furthermore, the driven-side clutch plate 48 is formed by the same material as the drive-side clutch plate 46.

Furthermore, in the present embodiment, the first casing 22 and the second casing 32 are formed by nonmagnetic bodies (e.g., aluminum, resin). It should be noted that the present invention is not limited to this configuration. For example, the first casing 22 and the second casing 32 may also be formed by magnetic bodies (e.g., iron).

It should be noted that the connection between the first casing 22 and the second casing 32 can be accomplished with bolts, for example. In a case where the first casing 22 and the second casing 32 are formed by a metal material, they may be connected to one another by welding, and in a case where the first casing 22 and the second casing 32 are formed by a resin material, they may connected to one another by thermal fusing. That is, any method may be used to connect the first casing 22 and the second casing 32 to one another as long as it is one with which they can be connected to one another.

A flow path 35 that guides the engine oil supplied into the pump portion 30 from the pump portion 30 to between contact surfaces of the drive-side clutch plate 46 and the driven-side clutch plate 48 is formed in the pump portion 30. Specifically, a groove is formed along the axial direction in the inner peripheral surface 34A of the cylinder portion 34, and this groove forms the flow path 35 that communicates the inside of the cylinder portion 36 with the inside of the first casing 22 (the cylinder portion 26). It should be noted that the opening of the flow path 35 is formed in the neighborhood between the contact surfaces of the drive-side clutch plate 46 and the driven-side clutch plate 48.

The negative pressure pump 10 has the control unit 80. The control unit 80 is configured to control the current applied to the electromagnet 52. The control unit 80 applies the current when the negative pressure produced by the pump portion 80 exceeds a prescribed value. Specifically, the negative pressure produced by the pump portion 80 is measured by a pressure sensor 82, and the control unit 80 applies the current to the electromagnet when the measured value exceeds the prescribed value.

Figure 8:
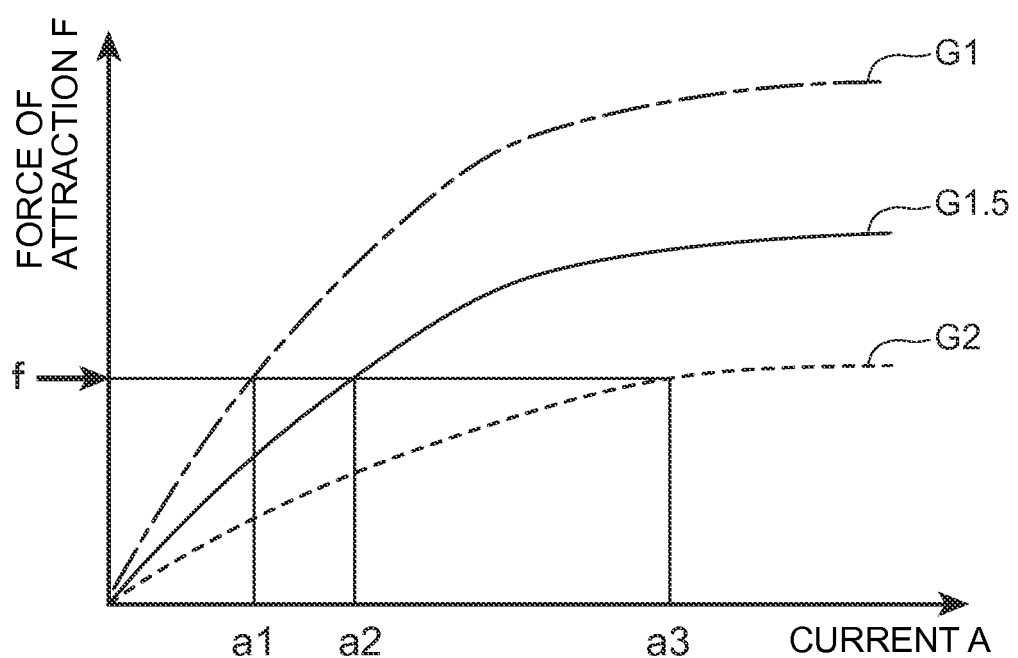
FIG. 8 is a graph showing the relationship between clutch gaps, the current applied to an electromagnet, and the force of attraction acting on the drive-side clutch plate.

Furthermore, the control unit 80 changes the current applied to the electromagnet 52 in accordance with the distance (hereinafter appropriately called a "clutch gap") G (see FIG. 2) between a contact surface 46C of the drive-side clutch plate 46 and a contact surface 48C of the driven-side clutch plate 48. Specifically, the control unit 80 performs control in such a way as bring the attractive force (force of attraction) acting on the drive-side clutch plate 46 closer to a constant value by increasing the current applied to the electromagnet 52 to make the magnetic force stronger when the clutch gap G is large and reducing the current applied to the electromagnet 52 to make the magnetic force weaker when the clutch gap G is small. An example of the method of control performed by the control unit 80 will be described using FIG. 8, which shows the relationship between the current A applied to the electromagnet 52 and the force of attraction F acting on the drive-side clutch plate 46. It should be noted that the long dashed short dashed line G1, the solid line G1.5 and the dashed line G2 in FIG. 8 represent cases in which the clutch gap G is 1 mm, 1.5 mm, and 2 mm, respectively. As shown in FIG. 8, in order to obtain a force of attraction f, current values of a1, a2, and a3 become necessary for G1, G2, and G3. That is, when pulling the drive-side clutch plate 46 away from the driven-side clutch plate 48, the control unit 80 increases the current applied to the electromagnet 52 because the clutch gap G is the largest, and after the drive-side clutch plate 46 has been pulled away from the driven-side clutch plate 48, the control unit 80 reduces the current applied to the electromagnet 52 because the clutch gap G becomes smaller, and thus power consumption can be controlled.

(Action)

Next, the action and effects of the negative pressure pump 10 pertaining to the present embodiment will be described.

In the negative pressure pump 10, the drive-side clutch plate 46 is pressed against, and engages with, the driven-side clutch plate 48 by the pressing force (spring force) of the coil spring 56, and thus the rotation of the drive shaft 100 is transmitted to the driven shaft 40 and the pump portion 30 produces negative pressure.

When the electromagnet 52 produces the magnetic force counter to the spring force of the coil spring 56, the electromagnet 52 attracts by means of its magnetic force the drive-side clutch plate 46, so the drive-side clutch plate 46 is pulled away from the driven-side clutch plate 48 and the state of engagement between the drive-side clutch plate 46 and the driven-side clutch plate 48 is canceled. Because of this, the pump portion 30 stops producing negative pressure.

In this way, the negative pressure pump 10 can intermittently transmit the rotation from the drive shaft 100 to the pump portion 30, so energy loss of the engine serving as the motive power source can be reduced. Because of this, the fuel economy of the vehicle can be improved.

Furthermore, in the negative pressure pump 10, the driven-side clutch plate 48 on which the spring force of the coil spring 56 acts is received by the jutting wall portion 38 disposed in the second casing 32. The one end portion 56A of the coil spring 56 is supported by the jutting wall portion 28 disposed in the first casing 22. Additionally, the drive-side clutch plate 46 that receives the spring force from the coil spring 56 and receives the magnetic force from the electromagnet 52 is movable in the axial direction of the drive shaft 100, so the action of the thrust force, caused by the spring force of the coil spring 56 and the magnetic force of the electromagnet 52, on the drive shaft 100 is controlled.

Moreover, because the driven-side clutch plate 48 is movable in the axial direction of the driven shaft 40, the action of the spring force of the coil spring 56 on the driven shaft 40 is controlled.

As described above, according to the negative pressure pump 10, the action of the thrust force on the drive shaft 100 driven to rotate by the engine can be controlled, and energy loss of the engine can be reduced by intermittently transmitting the rotation from the drive shaft 100.

Furthermore, in the negative pressure pump 10, because the first casing 22 and the second casing 32 are each nonmagnetic bodies, the magnetic force produced from the electromagnet 52 is not transmitted (the magnetic force is not dispersed) to the first casing 22 and the second casing 32, so energy consumption can be controlled and the drive-side clutch plate 46 can be pulled away from the driven-side clutch plate 48.

Moreover, in the negative pressure pump 10, the engine oil is supplied, through the flow path 35, to the contact surface 46C of the drive-side clutch plate 46 and the contact surface 48C of the driven-side clutch plate 48, so wear on the contact surfaces 46C and 48C of the drive-side clutch plate 46 and the driven-side clutch plate 48 is controlled. Furthermore, heat produced by friction between the drive-side clutch plate 46 and the driven-side clutch plate 48 is also controlled.

Furthermore, because the drive-side clutch plate 46 and the driven-side clutch plate 48 are both formed so as to be movable in the same axial direction, the drive-side clutch plate 46 can be smoothly caused to engage with (refasten to) the driven-side clutch plate 48.

Moreover, even if, for example, a disruption in the supply of current to the electromagnet 52 were to occur, the negative pressure brake booster 110 can be operated because the negative pressure pump 10 itself operates.

Moreover, in the negative pressure pump 10, when the engine has stopped, sometimes the engine oil flows back and collects in the pump portion 30 because of the negative pressure in the pump portion 30. Thereafter, if the engine oil is pooled in the pump portion 30 when the engine restarts, there is the concern that the rotational resistance of the vane 42 will increase and that the startability of the engine will deteriorate. For this reason, in the present embodiment, the control unit 80 is given a configuration wherein the case of restarting the engine, when it is applying a current to a cell motor, for example, it applies the current to the electromagnetic 52 at the same time. When the current is applied to the electromagnet 52 in this way, the drive-side clutch plate 46 is pulled away from the driven-side clutch plate 48, so when the engine restarts, the pump portion 30 does not operate and no longer affects the startability of the engine. Additionally, after the engine starts up, such as when the cell motor switches off, for example, the control unit 80 stops applying the current to the electromagnet 52, and thus the negative pressure pump 10 is operated by the motive power of the rotating engine. Furthermore, at this time, the control unit 80 controls the current in such a way as to gradually lower the current to the electromagnet 52, and thus the vane 42 of the negative pressure pump 10 slowly rotates and discharges the engine oil in the pump portion 30 to the outside of the pump portion 30, so damage to the pump portion 30 can also be controlled.

In the first embodiment, the negative pressure pump 10 is given a configuration where the first casing 22 and the second casing 32 are formed by nonmagnetic bodies, but the present invention is not limited to this configuration, and just the first casing 22 may be formed by a nonmagnetic body.

Figure 4:
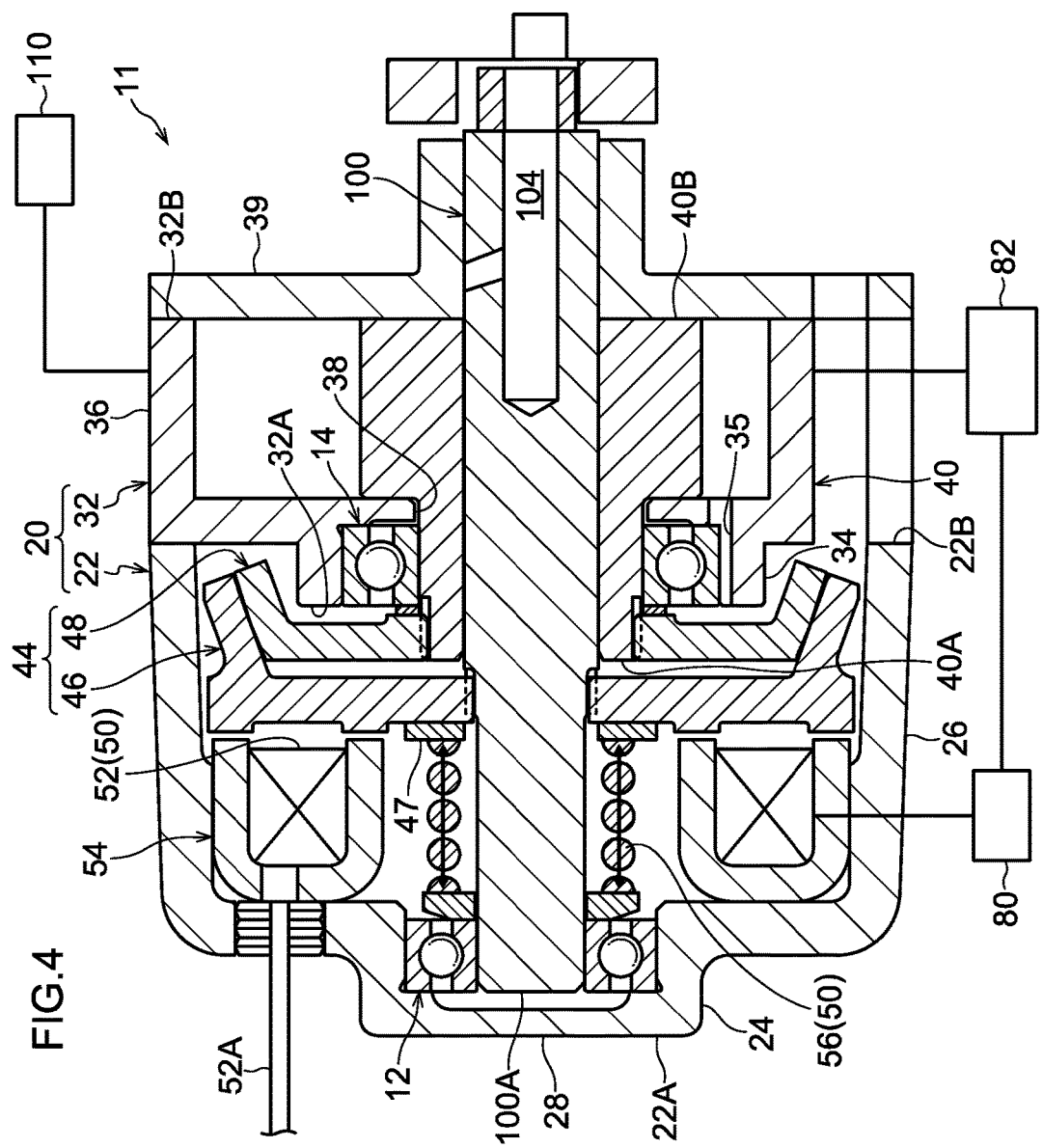
FIG. 4 is a sectional view, along the axial direction, of an example modification of the negative pressure pump of the first embodiment.
Figure 5:
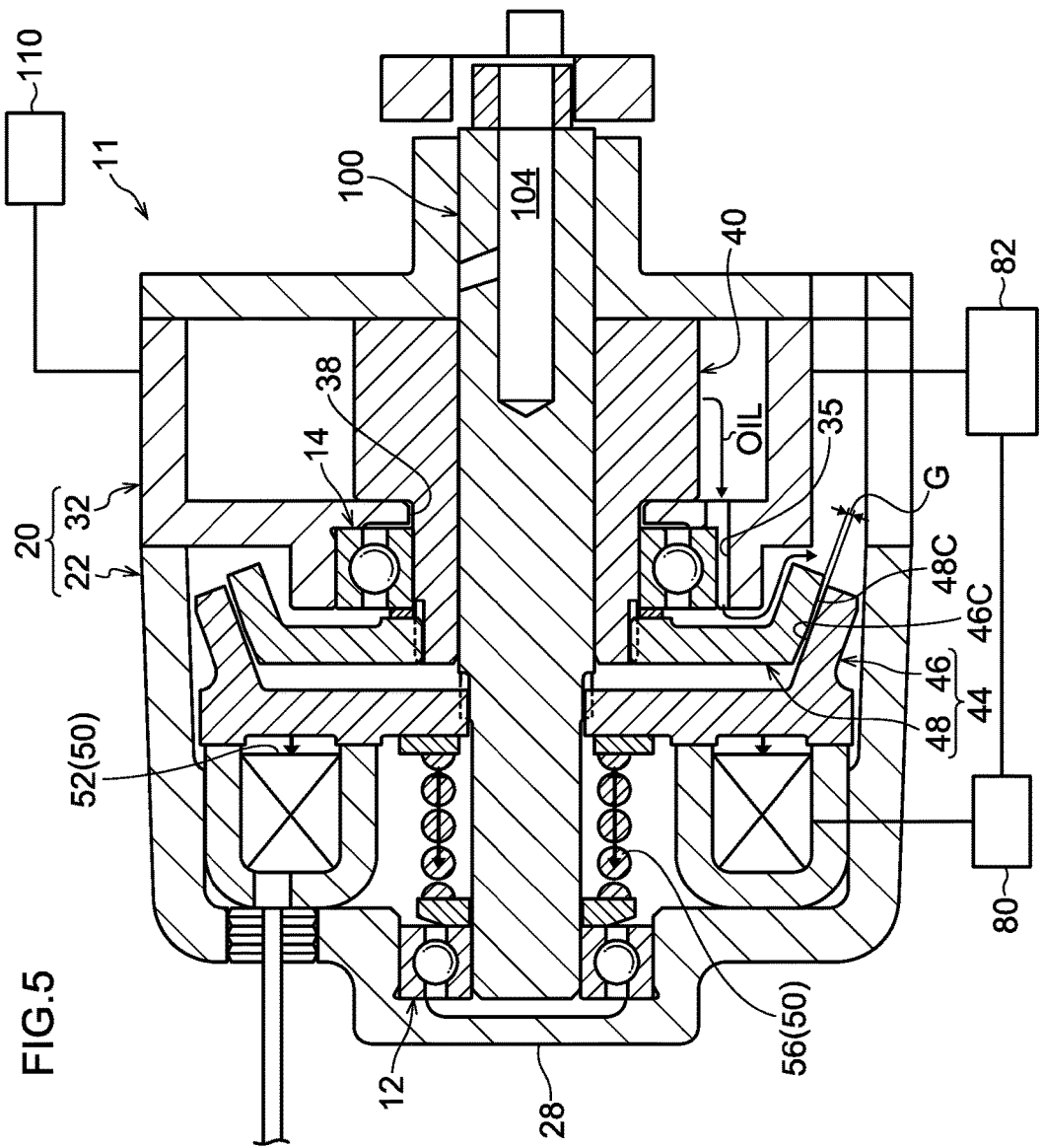
FIG. 5 is a sectional view, along the axial direction of the negative pressure pump, showing a state in which the drive-side clutch plate has been pulled away from the driven-side clutch plate in the negative pressure pump of FIG. 4.

In the negative pressure pump 10 of the first embodiment, as shown in FIG. 1, the negative pressure pump 10 is given a configuration where the drive shaft 100 is inserted from the first casing 22 of the negative pressure pump 10, but the present invention is not limited to this configuration and, like a negative pressure pump 11 of an example modification shown in FIG. 4 and FIG. 5, may also be given a configuration where the drive shaft 100 is inserted from the second casing 32. Specifically, as shown in FIG. 4 and FIG. 5, in the negative pressure pump 11, the cylinder portion 24 is closed off by the jutting wall portion 28 of the first casing 22, an open portion is instead formed in the cover 39 of the second casing 32, and the drive shaft 100 is inserted from this open portion.

Second Embodiment

Figure 6:
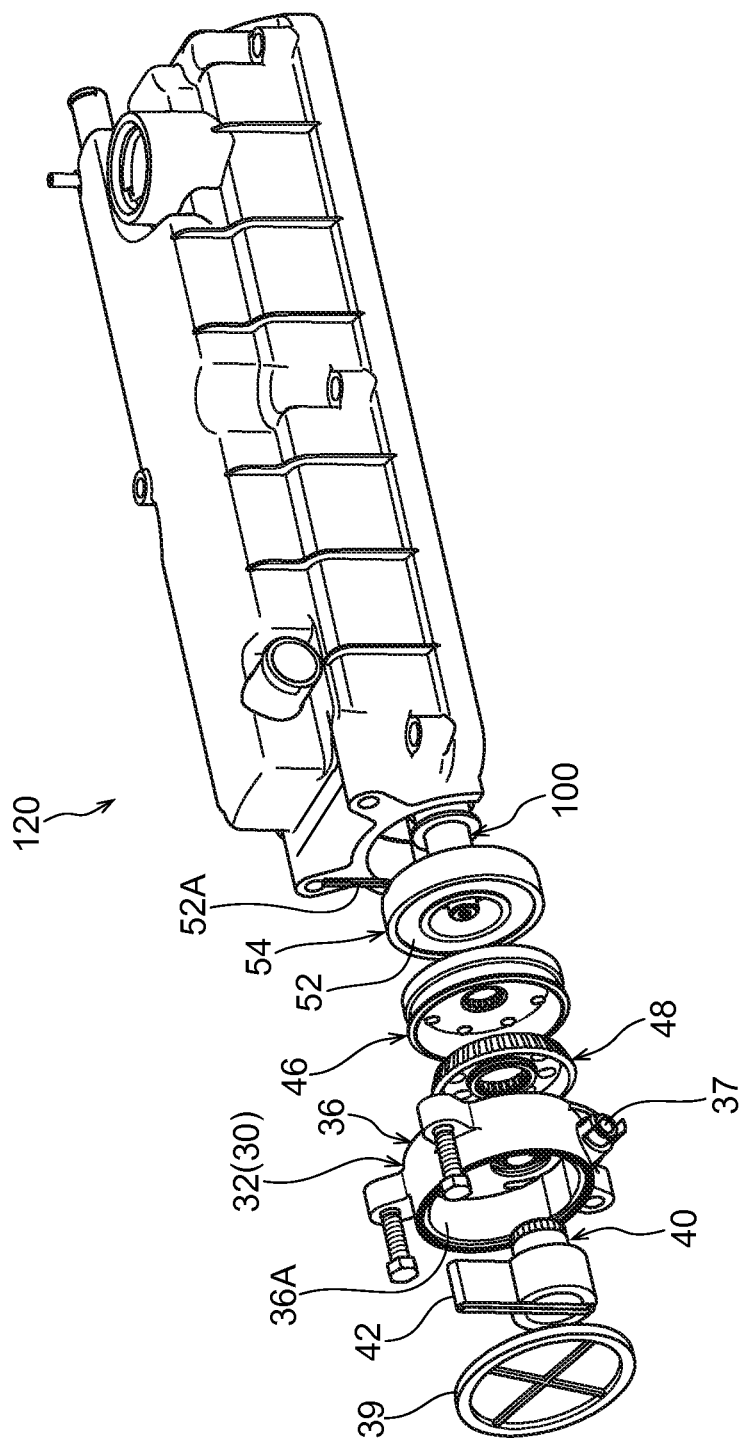
FIG. 6 is an exploded perspective view of a cylinder head cover of a second embodiment of the present invention.
Figure 7:
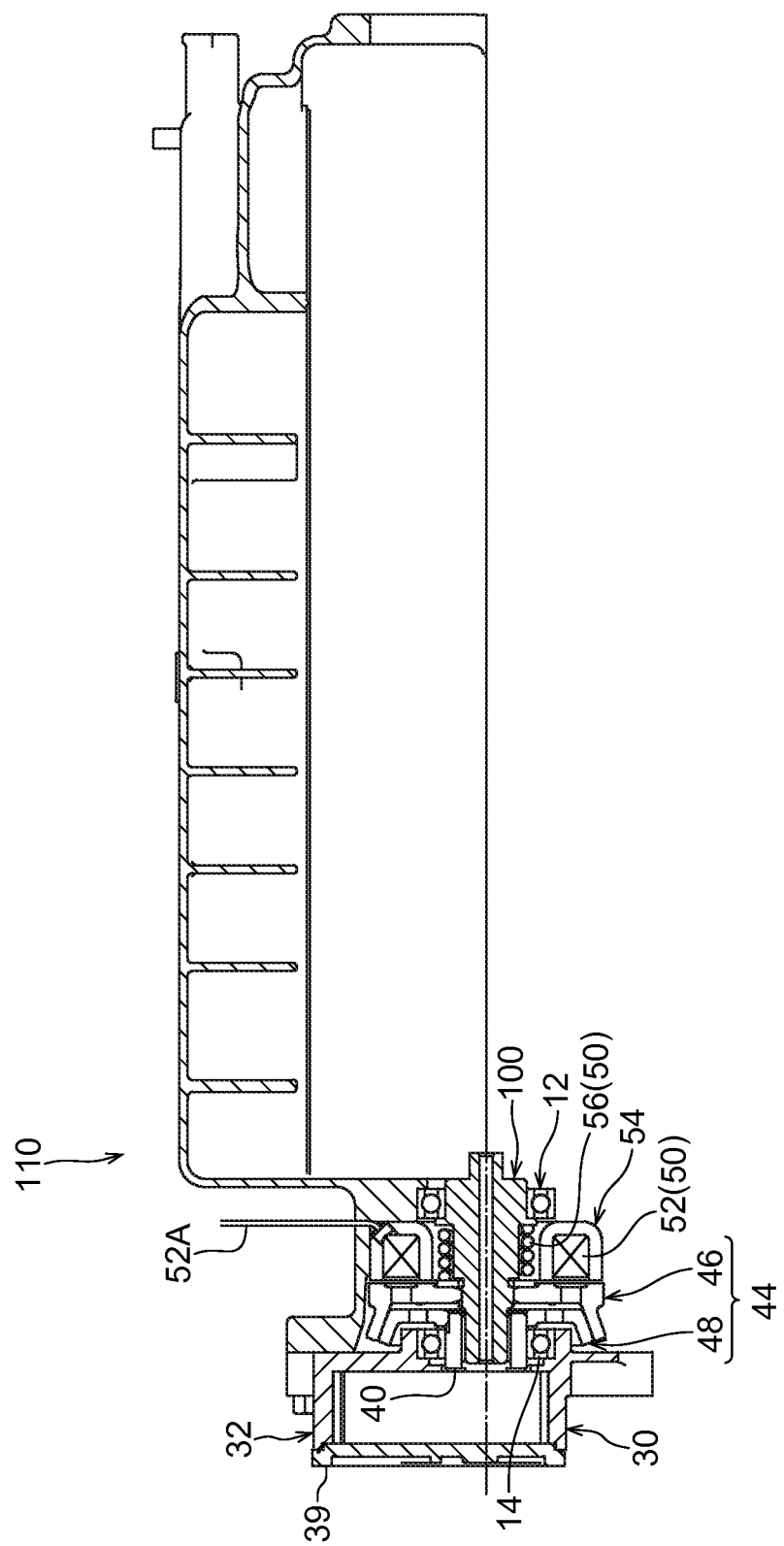
FIG. 7 is a sectional view, along the axial direction of the negative pressure pump, of the cylinder head cover of FIG. 6.

Next, an example of a cylinder head cover 120 pertaining to a second embodiment of the present invention will be described in accordance with FIG. 6 and FIG. 7.

The cylinder head cover 120 of the present embodiment is used to cover a cylinder head of an engine. The cylinder head cover 120 is equipped with the negative pressure pump 10 of the first embodiment. Furthermore, part of the cylinder head cover 120 configures (doubles as) the first casing 22 of the negative pressure pump 10.

It should be noted that the cylinder head cover 120 may comprise a magnetic body or a nonmagnetic body, but in the present embodiment it is formed by resin.

Next, the action and effects of the cylinder head cover 120 of the present embodiment will be described.

Because the cylinder head cover 120 is equipped with the negative pressure pump 10, the action of the thrust force on the drive shaft 100 driven to rotate by the engine can be controlled, and energy loss of the engine can be reduced by intermittently transmitting the rotation from the drive shaft 100. Because of this, the fuel economy of the engine (vehicle) can be improved.

Furthermore, because the cylinder head cover 120 forms the first casing 22, manufacturing costs can be reduced compared, for example, to a configuration where the cylinder head cover 120 and the negative pressure pump 10 are separate bodies.

It should be noted that although the present invention has been described in detail in regard to specific embodiments, the present invention is not limited to these embodiments; it will be apparent to those skilled in the art that a variety of other embodiments are possible in the scope of the present invention.

Furthermore, the disclosure of Japanese Patent Application No. 2013-157712, filed on Jul. 30, 2013, is incorporated in its entirety by reference herein.

EXPLANATION OF THE REFERENCE NUMERALS

10 Negative Pressure Pump
20 Casing
28 Jutting Wall Portion (Second Wall Portion)
30 Pump Portion
35 Flow Path
38 Jutting Wall Portion (First Wall Portion)
40 Driven Shaft
46 Drive-side Clutch Plate
48 Driven-side Clutch Plate
52 Electromagnet
56 Coil Spring (Elastic Body)
56A One End Portion
100 Drive Shaft
120 Cylinder Head Cover

The invention claimed is:
1. A negative pressure pump comprising:
   a casing inside of which a drive shaft driven to rotate by a motive power source is inserted and disposed;

a pump portion that is formed in the casing, is equipped with a driven shaft, and produces negative pressure as a result of the rotation of the drive shaft being transmitted to the driven shaft;

a drive-side clutch plate that is attached to the drive shaft, is movable in an axial direction of the drive shaft, rotates integrally with the drive shaft, and is magnetic;

a driven-side clutch plate that is attached to the driven shaft, is movable in an axial direction of the driven shaft, rotates integrally with the driven shaft, and transmits the rotation from the drive shaft to the driven shaft as a result of the drive-side clutch plate becoming engaged with the driven-side clutch plate;

an elastic body which, by means of its elastic force, presses the drive-side clutch plate against the driven-side clutch plate to cause the drive-side clutch plate to engage with the driven-side clutch plate;

an electromagnet that is fixed to the casing, produces a magnetic force counter to a pressing force of the elastic body, and pulls the drive-side clutch plate away from the driven-side clutch plate to cancel a state of engagement therebetween;

a first wall portion that is disposed on a pump portion side of the casing and receives the pressing force of the elastic body in a direction toward the first wall portion transmitted from the drive-side clutch plate to the driven-side clutch plate, via a first bearing rotatably supporting the driven shaft; and a second wall portion that is disposed on an opposite side from the pump portion side of the casing and supports an end portion, on the opposite side, of the elastic body via a second bearing rotatably supporting the drive shaft.

2. The negative pressure pump according to claim 1, wherein all or part of the casing is a nonmagnetic body.

3. The negative pressure pump according to claim 1, wherein a flow path that guides a lubricant supplied into the pump portion, and from the pump portion to contact surfaces of the drive-side clutch plate and the driven-side clutch plate is formed in the casing.

4. The negative pressure pump according to claim 1, wherein the negative pressure pump changes a current applied to the electromagnet in accordance with a distance between contact surfaces of the drive-side clutch plate and the driven-side clutch plate.

5. A cylinder head cover that is equipped with the negative pressure pump according to claim 1, forms part of the casing, and covers a cylinder head of an engine serving as a motive power source.

* * * * *